United States Patent [19]
McDowell

[11] 3,939,324
[45] Feb. 17, 1976

[54] APPARATUS FOR WELDING A JOINT BETWEEN TWO CLOSELY SPACED VERTICAL MEMBERS

[75] Inventor: Wendell V. McDowell, Pottstown, Pa.

[73] Assignee: Bethlehem Steel Corporation, Bethlehem, Pa.

[22] Filed: Oct. 7, 1974

[21] Appl. No.: 512,381

[52] U.S. Cl................................. 219/126; 219/73
[51] Int. Cl.² .......................................... B23K 9/12
[58] Field of Search ............................. 219/73, 126

[56] References Cited
UNITED STATES PATENTS
3,594,538   7/1971   Broodman .......................... 219/73

FOREIGN PATENTS OR APPLICATIONS
402,945   5/1970   Australia............................ 219/126
24,298   10/1968   Japan.................................. 219/73

Primary Examiner—J. V. Truhe
Assistant Examiner—N. D. Herkamp
Attorney, Agent, or Firm—Joseph J. O'Keefe; John I. Iverson; Robert M. Jones

[57] ABSTRACT

A consumable electrode guide tube is connected to a holder disposed at the top of a long vertical joint to be welded. Power is short circuited from the holder to a point midway along the tube until the lower half of the joint is welded, after which time the short is removed and the upper half of the joint is welded in the conventional manner.

1 Claim, 4 Drawing Figures

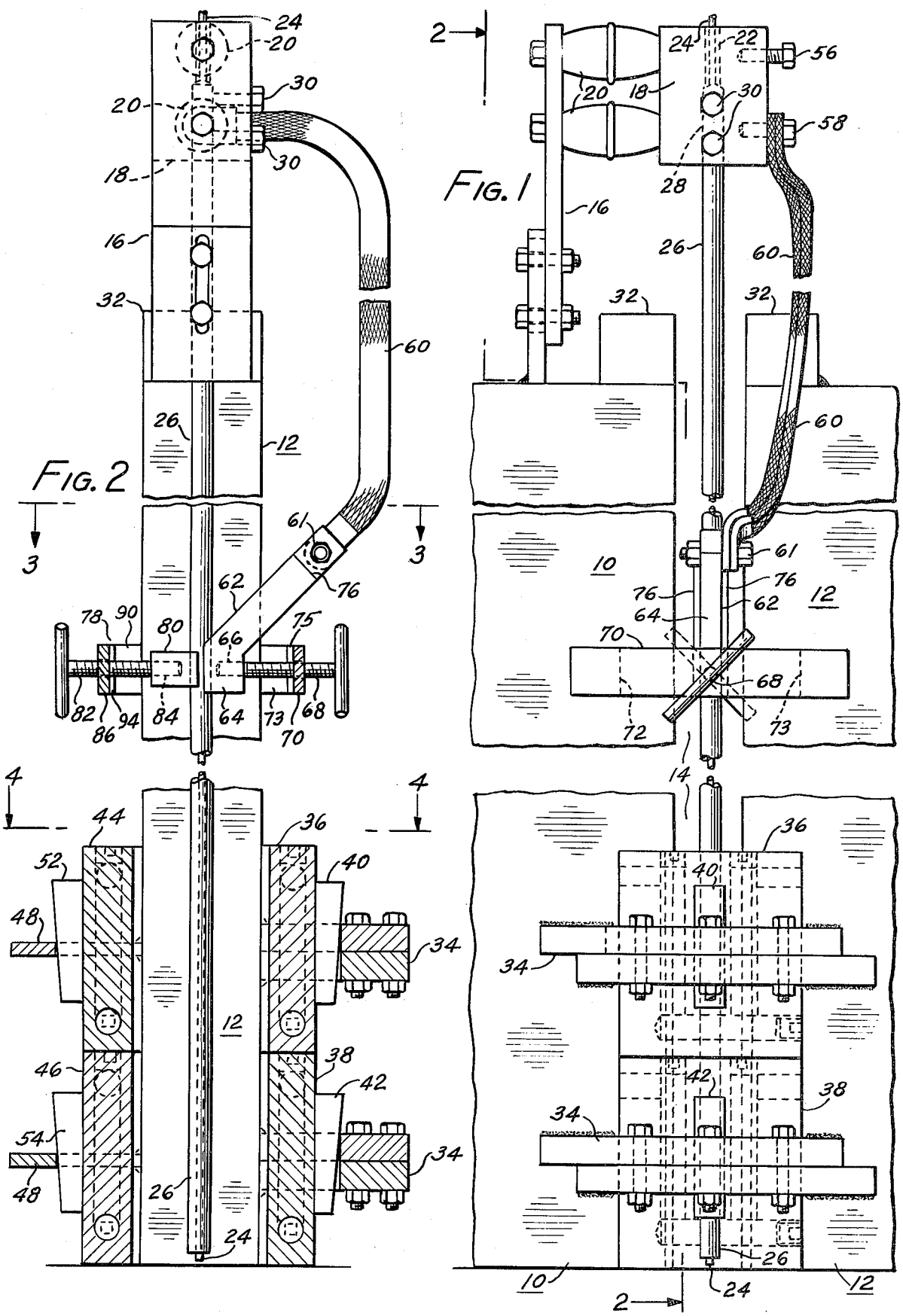

APPARATUS FOR WELDING A JOINT BETWEEN TWO CLOSELY SPACED VERTICAL MEMBERS

BACKGROUND OF THE INVENTION

This invention relates to welding, and more particularly to an apparatus and method for butt welding a joint between two closely spaced vertical members.

In the electroslag welding of a joint between two closely spaced vertical members, e.g. steel plates, with consumable electrodes, a plurality of strongbacks are secured across the joint lengthwise thereof to maintain the joint opening constant during the welding of the joint. A pair of watercooled weld retaining shoes is then wedged between said strongbacks and said plates in registry on each side of the joint at the lower end thereof, one shoe of each pair being disposed directly above the other shoe. A consumable electrode guide tube, through which a weld wire is fed, is secured to the plates at the upper end thereof, said guide tube and wire extending to a point approximately at the bottom of the joint. Current is then supplied to the top of the guide tube resulting in a short circuit at the bottom of the joint between the end of the weld wire and the steel plates. A semiconductor granular flux is then added to the bottom of the joint, said flux becoming molten as a result of the heat produced by the short circuit. The molten flux covers the weld metal deposited in the joint as a result of the weld wire melting.

Up to this point, the process would be considered to be submerged arc welding. However, the welding mode changes to electroslag when the molten flux becomes hot enough to melt the constantly feeding weld wire, resulting in the termination of the arc between the end of the wire and the metal forming the joint.

As the weld metal solidifies and fills the joint, the molten flux, disposed on top of the rising weld, steadily consumes the guide tube as well as the constantly feeding wire. By capillary action and magnetic attraction, the melt, consisting of the melted portions of the wire and consumable guide tube, is attracted to the edges of the steel plates forming the joint and fuses therewith.

After the weld metal has solidified adjacent the lower shoes, and while the weld metal is being deposited in the joint adjacent the upper shoes, the lower shoes are "leap-frogged" over the upper shoes whereby one set of shoes is always disposed contiguous to liquid weld metal as the weld progresses upwardly along the joint.

While the foregoing method of welding vertical joints has been successful for relatively short joints, e.g. 3 meters or less, this method has been less than satisfactory for longer joints. This is due to high currents, as well as to the large voltage drop across the guide tube from the top to the bottom thereof during the initiation of the weld. The high currents cause the temperature of the guide tube to increase, thereby expanding the welding wire and restricting the flow thereof through the guide tube. The large voltage drop causes the voltage at the pool of weld metal to be too low for optimum welding to occur.

It is an object of this invention to provide a method and apparatus for electroslag welding a long joint between vertical members with consumable electrodes whereby the magnitudes of the voltage drop across, and the current through, the guide tube are limited to tolerable values.

SUMMARY OF THE INVENTION

I have discovered that the foregoing object can be obtained by initially short circuiting an upper portion of the guide tube by connecting the power supply to an intermediate point therealong. The liquid weld metal retaining means, i.e. the shoes, are then progressively moved upwardly along the joint in the conventional manner as the butt weld is completed. When the pool of weld metal has reached a point just below said intermediate point, the short circuit is removed and the weld is finished in the conventional manner.

BRIEF DESCRIPTION OF THE DRAWINGS

FIG. 1 is a front elevation of the apparatus of the invention.

FIG. 2 is an end elevation taken along the lines 2—2 of FIG. 1.

DESCRIPTION OF THE PREFERRED EMBODIMENT

Figure 3:
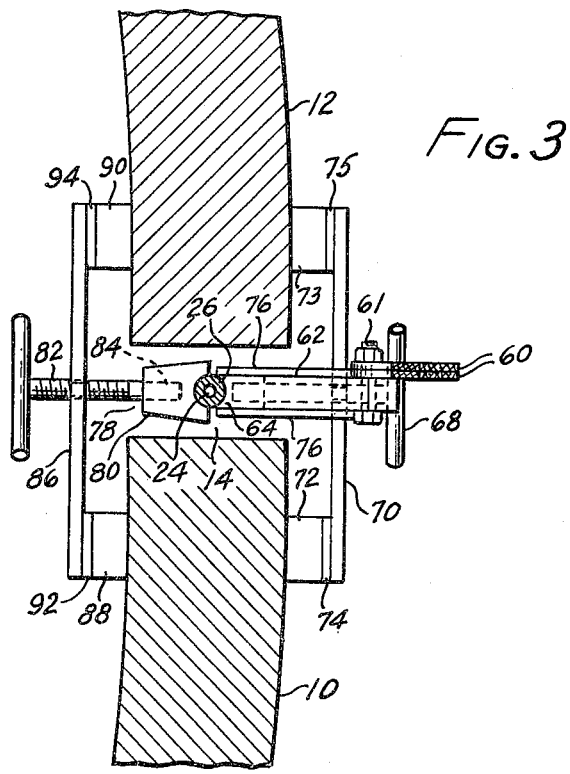
FIG. 3 is a sectional view taken along the lines 3—3 of FIG. 2.

As shown in FIG. 1, first and second vertical steel plates 10 and 12 are to be welded along the joint 14. Temporarily secured to the top edge of plate 10, by tack welding, for example, is a mounting plate assembly 16 to which a consumable electrode guide tube holder 18 is mounted through insulating blocks 20.

The guide tube holder 18 is provided with a bore 22 through which a welding wire 24 is supplied. The welding wire passes through a consumable guide tube 26 which is secured in another bore 28 in the holder 18 by bolts 30, said tube extending to about the bottom of the joint 14.

Figure 4:
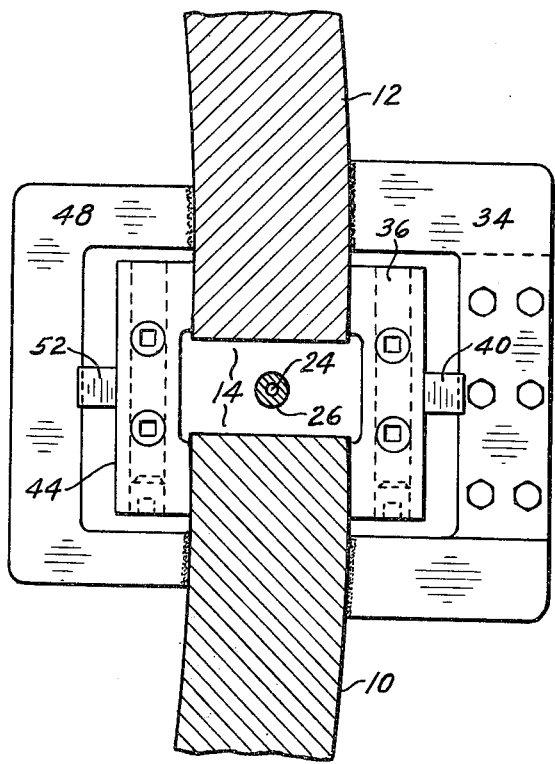
FIG. 4 is a sectional view taken along the lines 4—4 of FIG. 2.

Temporarily secured, e.g. by tack welding, across the plates 10 and 12 at the top thereof are runoff tabs 32 which prevent spillage of molten flux until the weld metal has reached the top of said plates. A plurality of transversely disposed strongbacks 34 and 48 are temporarily secured across the joint 14 lengthwise thereof. The strongbacks 34, disposed along one side of the joint, maintain the joint spacing as well as provide means for holding in place weld-retaining shoes along said side, while the strongbacks 48 are required solely for holding weld-retaining shoes in place on the opposite sides of the joint. As shown in FIGS. 1, 2 and 4, a pair of weld-retaining shoes 36 and 38 are held in place by the lowest pair of said strongbacks 34 and wedges 40 and 42, respectively. Similarly, a pair of weld-retaining shoes 44 and 46 are held in place on the opposite side of the plates 10 and 12 by strongbacks 48 and wedges 52 and 54, respectively. The oppositely disposed weld-retaining shoes are substantially in registry and have a facing spanning the joint 14. Said shoes are preferably made of copper, and are internally cooled by water during the welding operation.

The guide tube holder 18 is provided with a first terminal bolt 56 adapted to be connected to a conventional welding power supply, e.g. a 750 ampere source. A second terminal bolt 58 has electrical cables 60 connected thereto which extend to a connecting bolt 61 on power pick-up shoe 62 making electrical contact with the guide tube 26 approximately midway therealong.

The power pick-up shoe 62 comprises a copper contact element 64 having its front end contoured to fit tightly against the guide tube 26. The rear end of the contact element 64 is provided with a bore 66 into which the shaft of a T-bolt 68 is slidably inserted. The shaft of the T-bolt 68 threadedly engages a plate 70 to which first and second magnets 72 and 73 are affixed, said magnets being separated from the plate 70 by means of electrical insulating spacers 74 and 75, respectively. The sides of the contact element 64 are also provided with electrical insulators 76.

Disposed directly opposite to the power pick-up shoe 62 is an insulator assembly 78. The insulator assembly 78 comprises an insulating element 80 having its front end contoured to fit tightly against the guide tube 26. The insulator assembly 78 is constructed similarly to the lower pick-up shoe 62, and is provided with a T-bolt 82 having its shaft slidably inserted into a bore 84 in the rear end of the insulating element 80. The shaft of the T-bolt 82 threadedly engages a plate 86 to which first and second magnets 88 and 90 are affixed, said magnets being separated from the plate 86 by means of electrical insulating spacers 92 and 94.

The subject apparatus operates substantially as follows. With the ends of the guide tube 26 and the wire 24 disposed at the bottom of the joint 14, current is fed to approximately the midpoint of the guide tube 26 via the short circuiting cables 60. A pool of weld metal then immediately begins to form between the cooling weld-retaining shoes 38 and 46. There is a slag floating on the metal as a result of the consumption of an added semiconductor flux, and the weld wire 24 is automatically being fed through the guide tube 26 at a predetermined rate.

As the weld metal rises above shoes 38 and 46 and approaches the tops of shoes 36 and 44, the shoes 38 and 46 are removed and "leap-frogged" to a position immediately above shoes 36 and 44, respectively. This procedure is repeated until the weld has reached a point immediately below the power pick-up shoe 62. The power pick-up shoe 62 and insulator assembly 78 are then removed from contact with the guide tube 26, thereby removing the short circuit from around the upper half of the tube 26. The insulation along the sides of the contact element 64 aids in preventing said element from shorting out against the sides of the plates 10 and 12 when said pick-up shoe is removed. The weld is then finished in the conventional manner.

While the invention has been described with the upper half of the guide tube shorted out, the length of the short circuit depends on the length of the joint to be welded. For example, if a 9 meter joint were to be welded, it might be advisable to place the power pick-up shoe initially ⅔ of the distance down the guide tube, i.e. 3 meters above the bottom of the joint, and to then shift the power pick-up shoe to a position ⅓ of the distance down the guide tube, i.e. 6 meters above the bottom of the joint. Finally, after the weld is just short of being ⅔ completed, the power pick-up shoe would be completely removed and the weld finished in the conventional manner.

I claim:

1. Apparatus for butt welding a joint between two closely spaced vertical members comprising:
  a. a pair of removable liquid weld retaining shoes disposed on each side of said joint, each of said pairs of shoes having a facing spanning said joint and being disposed substantially in registry with the shoes on the opposite side of said joint,
  b. a conductive electrode guide tube holder disposed at a point above said joint,
  c. a conductive consumable electrode guide tube secured to said holder and extending to about the bottom of said joint,
  d. a conductive shoe, adapted to be placed in contact with said guide tube at a point intermediate the length of said joint, comprising:
    i. a contact element having its front end contoured to fit against said guide tube;
    ii. a rotatable shaft slidably inserted into the rear end of said contact element; and
    iii. a plate, threadedly engaging said shaft, having magnet means affixed thereto for magnetically engaging said vertical members,
  e. means, adapted to be placed in contact with said guide tube at a point opposite said conductive shoe for maintaining said shoe and guide tube in contact, comprising:
    i. an insulating element having its front end contoured to fit against said guide tube;
    ii. a rotatable shaft slidably inserted into the rear end of said insulating element; and
    iii. a plate, threadedly engaging said shaft, having magnet means affixed thereto for magnetically engaging the opposite side of said vertical members,
  f. power supply means connected to said guide tube holder, and
  g. conductive means connected from said guide tube holder to said conductive shoe.

* * * * *